United States Patent [19]
Yamaguchi

[11] Patent Number: 5,606,656
[45] Date of Patent: Feb. 25, 1997

[54] IMAGE DATA PROCESSING UNIT FOR FORMING A PLURALITY OF IDENTICAL IMAGES IN A SINGLE OUTPUT IMAGE AREA

[75] Inventor: Yukio Yamaguchi, Yotsukaido, Japan

[73] Assignee: Ricoh Company, Ltd., Tokyo, Japan

[21] Appl. No.: 459,693

[22] Filed: Jun. 2, 1995

Related U.S. Application Data

[63] Continuation of Ser. No. 124,039, Sep. 21, 1993, abandoned.

[30] Foreign Application Priority Data

Sep. 25, 1992 [JP] Japan .................................... 4-256046

[51] Int. Cl.$^6$ ...................................... G06F 15/00
[52] U.S. Cl. ................ 395/501; 395/126; 395/132; 395/516; 395/507; 345/113; 345/4; 345/24
[58] Field of Search .................... 395/162–166, 395/126, 129, 132, 157; 345/4–5, 24, 27, 112, 113, 119, 120, 139, 147, 185, 189, 190, 192, 193, 200

[56] References Cited

U.S. PATENT DOCUMENTS

| | | | |
|---|---|---|---|
| 4,148,070 | 4/1979 | Taylor | 348/719 |
| 4,163,249 | 7/1979 | Michael et al. | 348/580 |
| 4,172,264 | 10/1979 | Taylor et al. | 348/722 |
| 4,360,831 | 11/1982 | Kellar | 345/113 |

FOREIGN PATENT DOCUMENTS 63-44565  3/1988  Japan ............................ H04N 1/387

*Primary Examiner*—Kee M. Tung
*Attorney, Agent, or Firm*—Lowe, Price, LeBlanc & Becker

[57] ABSTRACT

A plurality of identical images are formed in a single output image area in a partially superimposed relationship. The image data processing unit is provided with a memory unit for storing image data corresponding to the identical images. A reading signal generating unit generates a plurality of reading signals used for reading out the image data in the memory unit. Each of the reading signals provides information for an area in which one identical image is to be formed. A selecting unit selects one of the reading signals supplied by the reading signal generating unit. The selection being performed when the areas, in each of which one image is to be formed, the image being identical, are at least partially superimposed with each other. The memory unit outputs image data stored therein in accordance with the selected reading signal supplied by the selecting unit.

14 Claims, 16 Drawing Sheets

IMAGE DATA PROCESSING UNIT FOR FORMING A PLURALITY OF IDENTICAL IMAGES IN A SINGLE OUTPUT IMAGE AREA

This is a continuation of U.S. patent application Ser. No. 08/124,039, filed Sep. 21, 1993, now abandoned.

BACKGROUND OF THE INVENTION

The present invention generally relates to image data processing units, and more particularly to an image data processing unit for reading out and processing image data, which unit can be used in apparatuses such as a digital copy machine or a printer, and can output data for identical image patterns so that a plurality of identical images are superimposed with each other on a single display area.

An image copy machine is described in Japanese Laid-Open Utility Model application No. 63-44565, in which copying machine image data read out by a scanner is stored in an image memory and the image data can be read out and output repeatedly so that identical image patterns can be displayed in various positions on a single output image area. However, the above image copy machine is not capable of designating displaying positions of the identical images so that the identical images are positioned in a superimposed relationship.

In view of a sense of design aesthetics, it is preferred in many cases that a plurality of identical image patterns are partially superimposed with each other. However, if a plurality of identical image patterns are simply superimposed by slightly offsetting each of the image patterns, the superimposed portions are not in a desired condition in terms of design aesthetics, due to a mixing of different portions of the superimposed images.

SUMMARY OF THE INVENTION

It is a general object of the present invention to provide an improved and useful image data processing unit in which the above-mentioned disadvantages are eliminated.

A more specific object of the present invention is to provide an image data processing unit which can output image data so that a plurality of identical images can be displayed in a superimposed relationship on a single image area.

Another object of the present invention is to provide an image data processing unit which can output image data so that a superimposed portion is processed to show a pleasing looking.

In order to achieve the above-mentioned objects, an image data processing unit of the present invention which can output image data to an image forming apparatus so that a plurality of identical images are formed in a single output image area, comprises:

a memory unit for storing image data corresponding to identical images, the image data being supplied by an external source;

a reading signal generating unit for generating a plurality of reading signals used for reading out the image data in the memory unit, each of the reading signals providing information for an area in the single output image in which area one identical image is to be formed;

a selecting unit for selecting one of the reading signals supplied by the reading signal generating unit, the selection being performed when the areas, in each of which one identical image is to be formed, are superimposed with each other, the memory unit outputting image data stored therein in accordance with the selected reading signal supplied by the selecting unit.

According to the present invention, a plurality of identical images are formed in a single output image area in a partially superimposed relationship. Either one of the identical images is formed in the superimposed portion, thus the superimposed portion is formed in desired condition in terms of design aesthetics.

Other objects, features, and advantages of the present invention will become more apparent from the following detailed description when read in conjunction with the accompanying drawings.

DETAILED DESCRIPTION OF THE PREFERRED EMBODIMENTS

Figure 1:
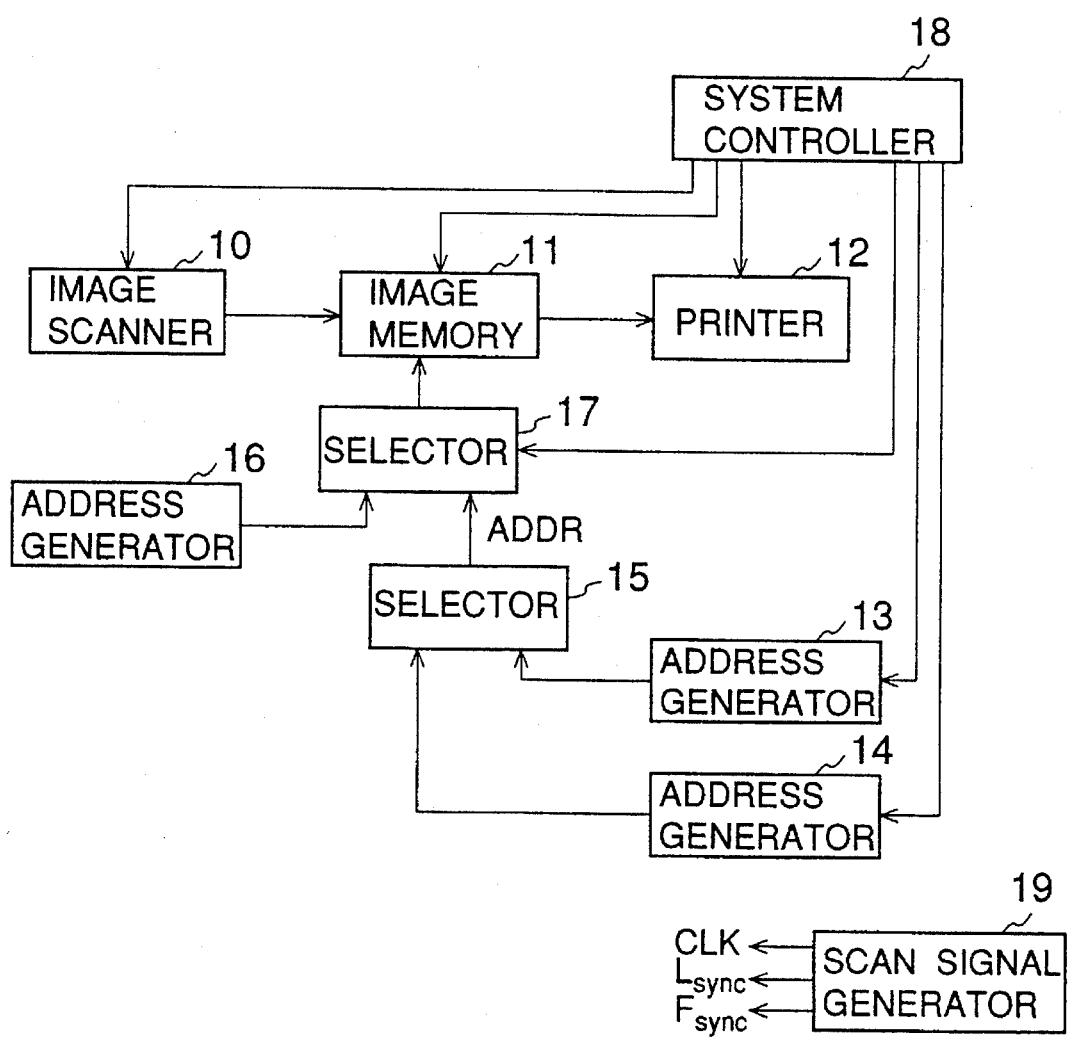
FIG. 1 is a block diagram of an embodiment of an image data processing unit according to the present invention.

A description will now be given, with reference to FIG. 1, of an embodiment of an image data processing unit according to the present invention. FIG. 1 shows a structure of the embodiment of the image data processing unit according to the present invention in a case where the present invention is applied to a digital copy machine.

The image data processing unit of FIG. 1 includes, similarly to conventional digital copy machines, an image scanner 10 which scans an original image, and a printer 12 which records on a sheet the image scanned by the image scanner 10. The image data processing unit can output to the printer 12 image information scanned by the image scanner 10 without altering the image information, that is, the unit can perform the same operation as is performed in general copy machines. Additionally, the image data processing unit is capable of outputting a plurality of relatively small images on a single image area by offsetting each of the small images with each other. This can be achieved by storing in an image memory 11 image data corresponding to a desired portion of the image scanned by the image scanner 10. The image data stored in the image memory 11 is repeatedly read out and output to the printer 12 in a single image-printing process, and thereby a plurality of identical images can be printed on a single sheet.

When the image data supplied by the image scanner 12 is written in the image memory 11, the image is stored in accordance with an address information supplied by an address generator 16. The address generator 16 generates and outputs address information used for storing the image data in the image memory 11 so that only the image data corresponding to the selected part of the image (referred to as image element) scanned by the image scanner 10 is stored in the image memory 11, the selected part being designated by an operator by means of an operational keyboard or a coordinates inputting device not shown in the figure.

When the image data stored in the image memory 11 is read out and output to the printer 12, address information generated by either an address generator 13 or an address generator 14 is supplied to the image memory 11 via a selectors 15 and 17 so that the image corresponding to the output from the image memory 11 is recorded in a predetermined position on the recording sheet synchronously with a scanning operation of the printer 12.

Figure 5:
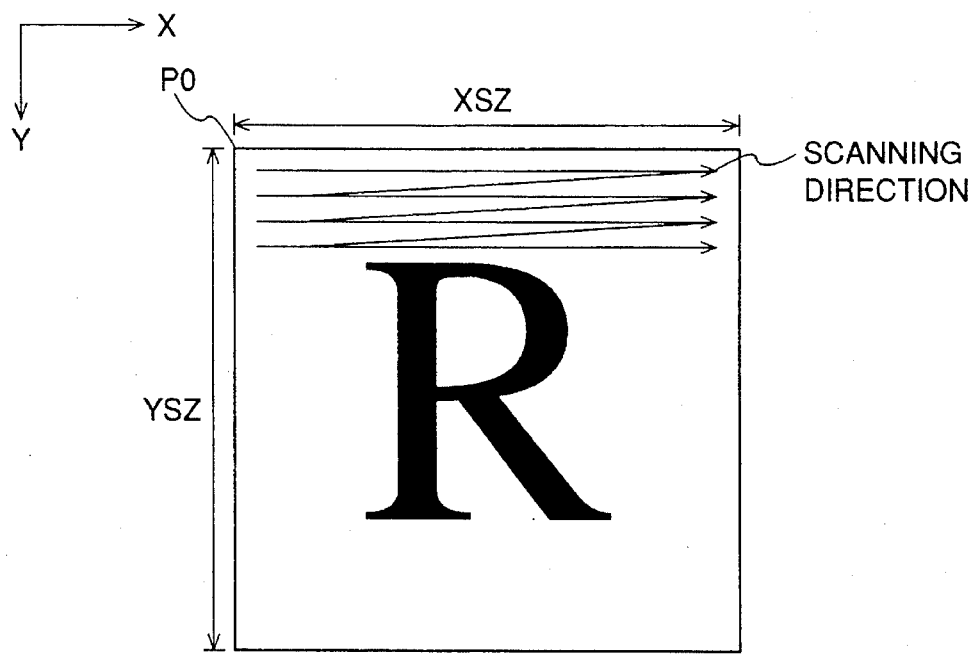
FIG. 5 is an illustration of a memory map in an image memory shown in FIG. 1.
Figure 8:
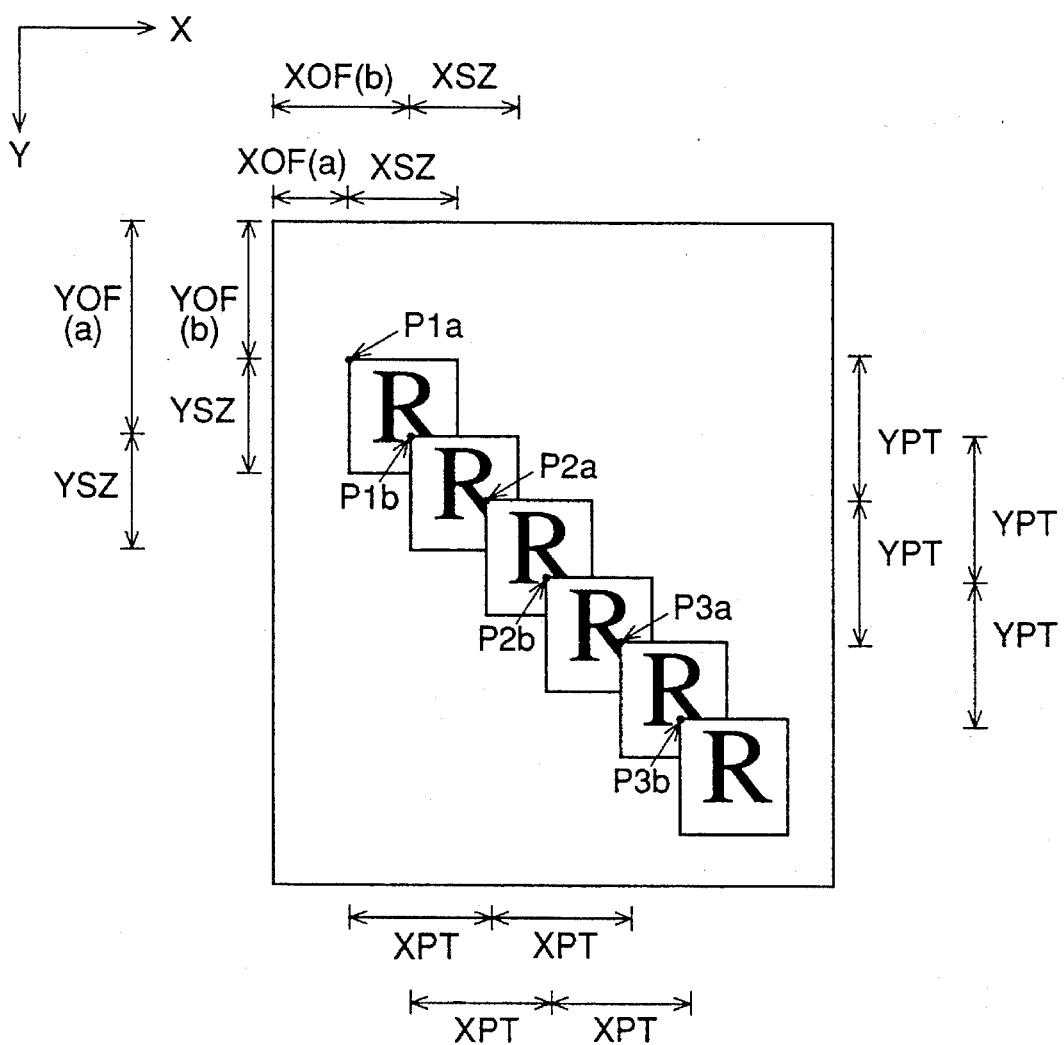
FIG. 8 is a plan view of an output image printed by the printer shown in FIG. 1.

If only a repeated operation of recording the image data stored in the image memory 11 is required, provision of either one of the selector 13 and the selector 14 is sufficient for performing such operation. However, an arrangement of image elements in a superimposed relationship, the image elements being diagonally arranged as shown in FIG. 8, cannot be achieved by such a construction. For example, when image data corresponding to an image element, "R", shown in FIG. 5 is stored in the image memory 11, and a plurality of image elements "R" are to be arranged, at least one of the following conditions must be satisfied.

Figure 4:
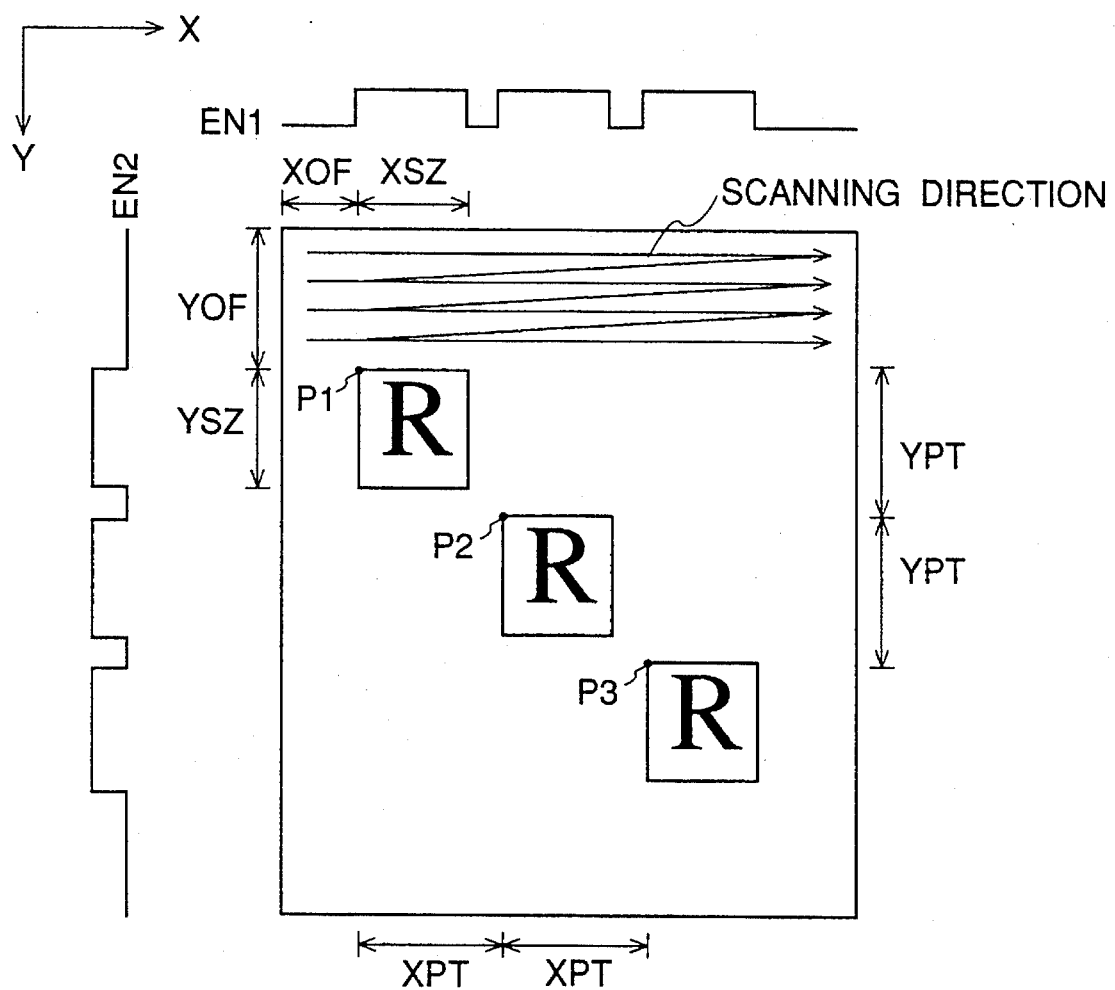
FIG. 4 is a plan view of an output image printed by a printer shown in FIG. 1.

1) XSZ≦XPT
2) YSZ≦YPT
3) XPT=0
4) YPT=0

Where XSZ is a length of the image element "R" in the X direction; YSZ is a length of the image element "R" in the Y direction; XPT is a pitch in a primary scanning direction; YPT is a pitch in a secondary scanning direction. The conditions 1) and 2) are for separating the image elements as shown in FIG. 4. The conditions 3) and 4) are for arranging the image elements in a superimposed relationship in the X direction and in the Y direction, respectively.

On the other hand, the present embodiment is able to record the image shown FIG. 8, in which image elements are arranged in a partially superimposed relationship in a diagonal direction because two address generators 13 and 14 for reading out the image data corresponding to the image element and the selector 15 are provided. Control of switching operation of writing in and reading out an image data in the image memory 11 is performed by system controller 18. The system controller 18 also performs a determination of a selected area of an scanned image, and a determination of a recording position of the image element in an output image. A scan signal generator 19 outputs: a timing signal CLK, $L_{sync}$ and $F_{sync}$ which are used for scanning the operation for writing in and reading out the image data in the memory 11. The signal CLK is a pulse synchronous with signals corresponding to each of pixels. The signal $L_{sync}$ is a pulse synchronous with generation of each scanning line. The signal $F_{sync}$ is a pulse synchronous with generation of each frame. The scanning operation for the output image is performed as shown in FIG. 4, and the scanning operation for the image memory 11 is performed as shown in FIG. 5.

Figure 2:
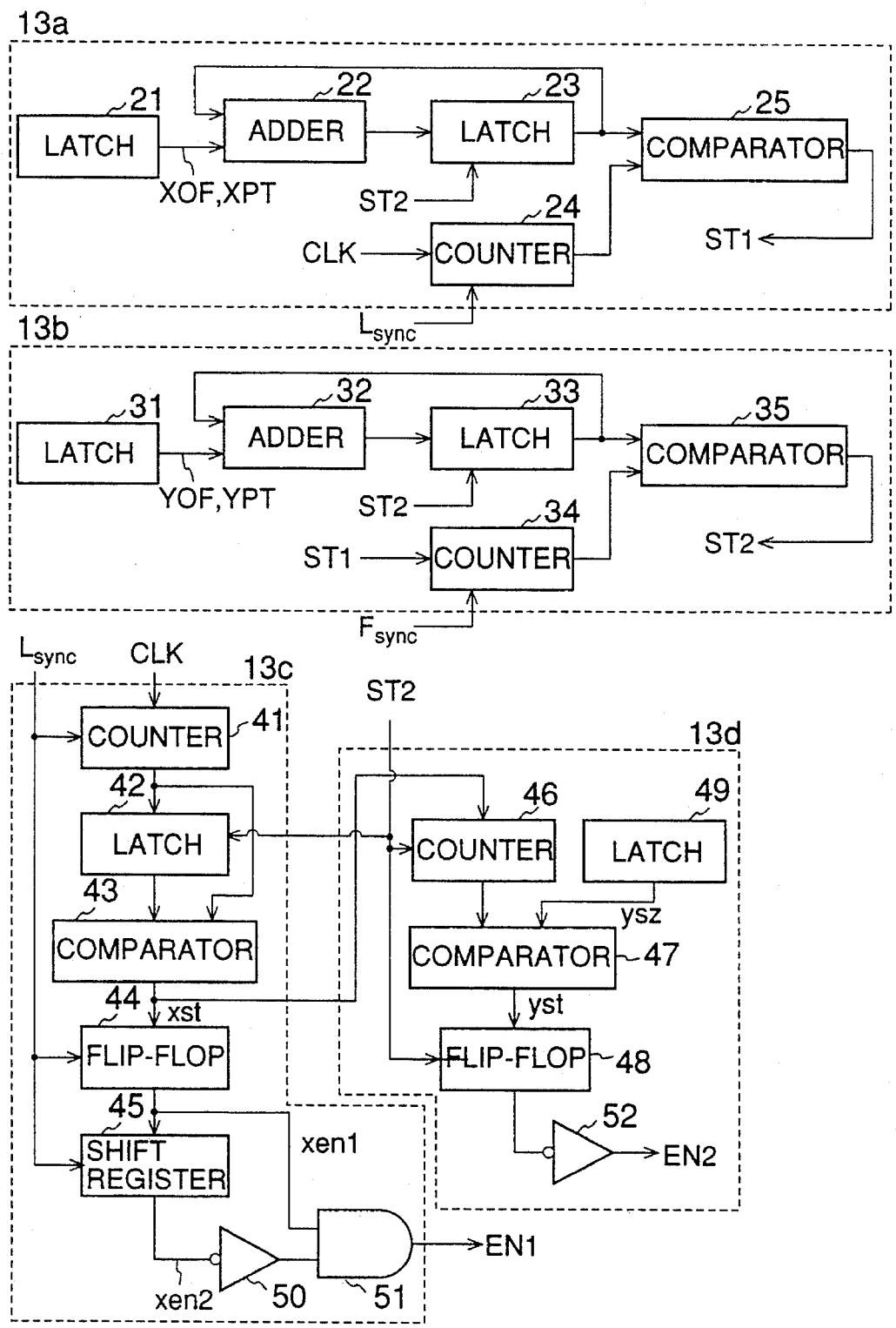
FIG. 2 is a block diagram showing an essential part of an address generator shown in FIG. 1.
Figure 3:
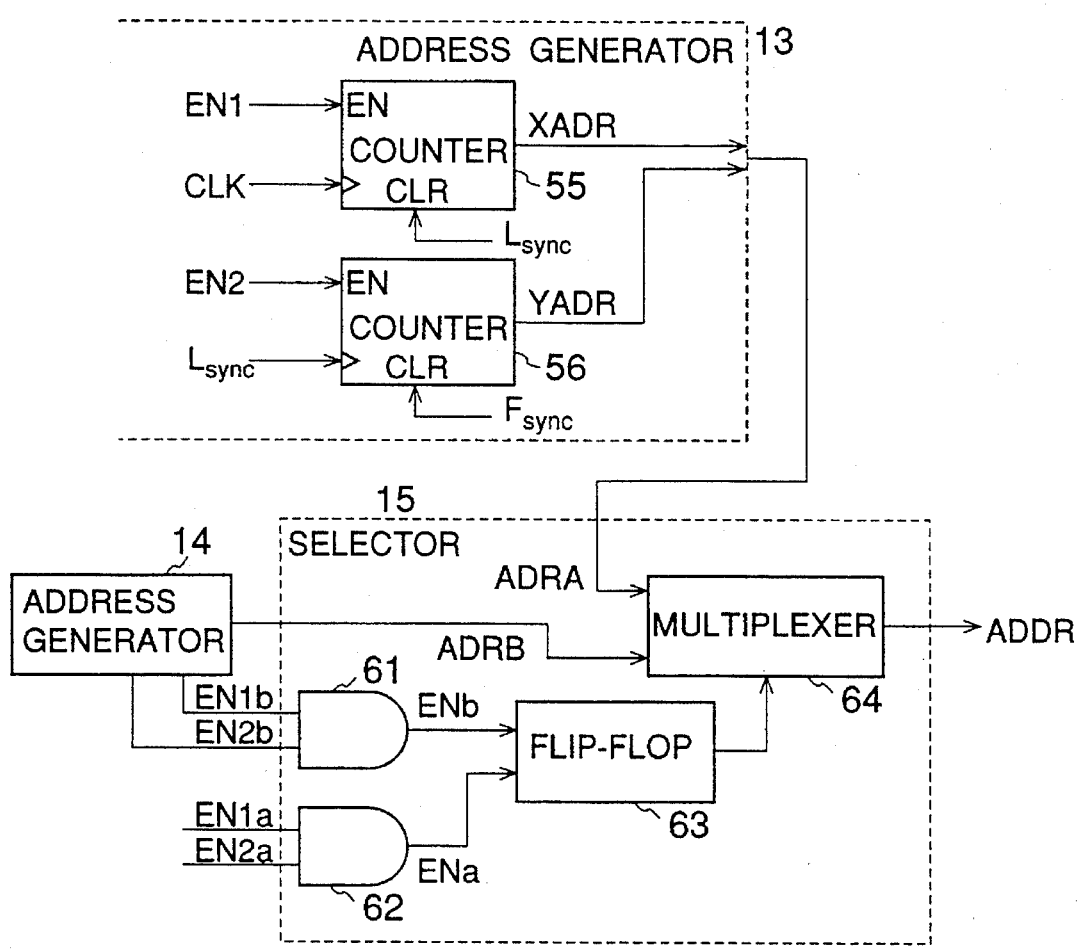
FIG. 3 is a block diagram showing the rest of the address generator of FIG. 2 and a selector also shown in FIG. 1.

FIG. 2 shows a construction of a part of the address generator 13, and FIG. 3 shows a construction of the rest of the address generator 13 and the selector 15. With reference to FIG. 2, circuits 13a and 13b together generate a signal ST2 which determines a datum point of the image element in the output image, and circuits 13c and 13d generate signals EN1 and EN2, respectively, which signals EN1 and EN2 represent an area of the image element in the output image. FIG. 4 shows an example of the output image, and in this example, the signal ST2 is generated at each point P1, P2 and P3. Then each image element is recorded in an area determined by XSZ in the X direction and YSZ in the Y direction from each of the points P2, and P3. The signal EN1 corresponds to the X scanning direction and a level of the signal EN1 is high during the time when the image elements are recorded in the X scanning direction; and the signal EN2 corresponds to the Y scanning direction and a level of the signal EN2 is high during the time when the image elements are recorded in the Y scanning direction.

A description will now be given of the circuit 13a of FIG. 2. A counter 24 counts up a clock pulse of the signal CLK after the counter is cleared at every line synchronous signal $L_{sync}$, and outputs a value corresponding to a position of a pixel being scanned in the primary direction (X scanning direction). A comparator 25 compares an output from a latch 23 with an output of the counter 24. If the output of the counter 24 is greater than the output of the latch 23, a level of an output of the comparator 25 shifts from a high level to a low level, and a signal ST1 is generated. Accordingly, when the output of the latch 23, for example, is x1, the signal ST1 is generated when a scanning position in the X direction passes the point corresponding to x1 in each scanning line.

In the circuit 13b, a counter 34 is cleared at every frame synchronous signal $F_{sync}$, and the counter 34 counts the signal ST1 supplied by the circuit 13a. A comparator 35 compares an output from a latch 33 with an output of the counter 34. If the output of the counter 34 is greater than the output of the latch 33, a level of an output of the comparator 35 shifts from a low level to a high level, and a signal ST2 is generated. Accordingly, when the output of the latch 33, for example, is y1, the signal ST2 is generated when a scanning position in the Y direction proceeds, by y1 lines, the position where the signal ST1 is generated.

When the signal ST2 is generated, the contents of the latch 23 and 33 are renewed. The input of the latch 23 is supplied with a value which is a sum of a value (for example, XPT) of contents in a latch 21 and an output value of the latch 23, that is, XPT is added by an adder 22 to the contents of the latch 23 when the signal ST2 is generated. Similarly, the input of the latch 33 is supplied with a value which is a sum of a value (for example, YPT) of contents in a latch 31 and an output value of the latch 33, that is, YPT is added by an adder 32 to the contents of the latch 33 when the signal ST2 is generated.

That is, when the signal ST2 is generated, a position in the X direction where the signal ST1 is generated shifts by XPT in the scanning direction. The signal ST2 is generated again at the position where the scanning position is proceeded by YPT in the Y direction. Values retained by the latches 23 and 33 are further renewed by this signal ST2, and the signal ST2 is generated again. This operation is repeated.

If the system controller 3 assigns offset values XOF and YOF to the latches 21 and 31, respectively, in an initial condition, and if the system controller 3 assigns offset values XPT and YPT to the latches 21 and 31, respectively, immediately after the time when the signal ST2 is generated first, the signal ST2 is generated at each point P1, P2 and P3 as shown in FIG. 4.

A description will now be given of the circuit 13c. A counter 41 counts up a clock pulse of the signal CLK after the counter is cleared at every line synchronous signal $L_{sync}$, and outputs a value corresponding to a position of a pixel being scanned in the X scanning direction. A value of an output of the counter 41 is supplied to the latch 42 and a comparator 43, and a value obtained when the signal ST2 is generated is retained in the latch 42. A comparator 43 compares an output from a latch 42 with an output of the counter 41. When the output of the counter 41 exceeds the output of the latch 43, a level of an output of the comparator 43 shifts from a low level to a high level, and a signal xst is generated. Accordingly, in each scanning line after the signal ST2 is generated, the signal xst is generated each time the scanning position passes a position x1 which is a position corresponding to the time when the signal ST2 is generated. A flip-flop 44 is cleared for each scan line at the time the signal $L_{sync}$ is generated, and is set when the signal xst is generated. A signal output from the flip-flop 44 is on one hand supplied to a gate 51 as a signal xen1, and on the other hand supplied via a shift register 45 to a gate 50 as a signal xen2. The shift register 45 generates a delay which corresponds to the dimension XSZ (number of pixels) of the image element in the X direction; the data of the image element being stored in the image memory 11. The shift register 45 is cleared by the signal $L_{sync}$. The signal EN1, which determines recording areas in the X direction, is output from the gate 51 in accordance with the signals xen1 and xen2.

A counter 41 counts up an output signal of the comparator 43 after the counter is cleared each time the signal ST2 is generated. A comparator 47 compares an output from a counter 46 with a value retained in a latch 49. When the output of the counter 46 exceeds the output of the latch 49, a level of an output of the comparator 47 shifts from a low level to a high level, and a signal yst is generated. The flip-flop 48 is cleared when the signal ST2 is generated and set when the signal yst is generated. An output of the flip-flop is then inverted by the inverter 52 and becomes the signal EN2 which determines recording areas in the Y direction.

Figure 6:
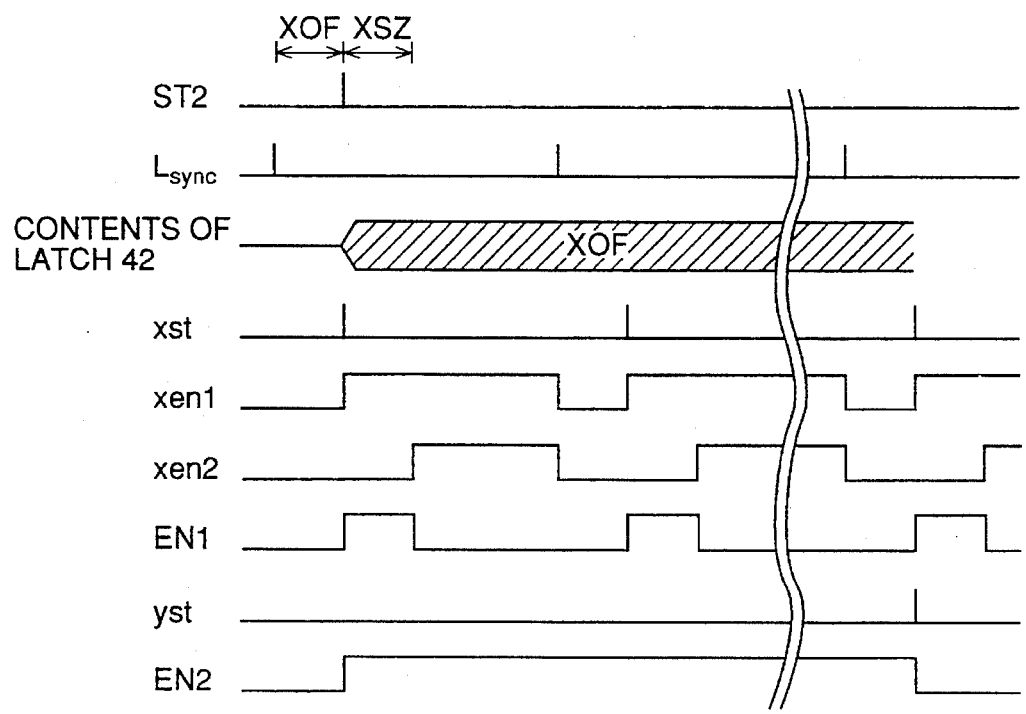
FIG. 6 is a time chart of signals in the address generator shown in FIG. 1.

The timing of the signals generated in the circuits 13c and 13d are shown in FIG. 6. The timing of the signals EN1 and EN2 are shown in FIG. 4.

A description will now be given, with reference to FIG. 3, of the rest of the address generator 13 and the selector 15. A counter 55 is cleared each time the scan line synchronous signal $L_{sync}$ is generated, and counts clock pulses of the clock signal CLK when the signal EN1 is at a high level. A counter 56 is cleared each time the frame synchronous signal $F_{sync}$ is generated, and counts the scan line synchronous signal $L_{sync}$ when the signal EN2 is at a high level. Accordingly, a signal XADR output from the counter 55 represents a scanning position (pixel coordinate value) in the X direction with respect to the position where the signal ST2 is generated, and a signal YADR output from the counter 56 represents a scanning position (pixel coordinate value) in the Y direction with respect to the position where the signal ST2 is generated.

The signals XADR and YADR are supplied to the selector 15 as an address information signal ADRA. At the same time, an address information signal ADRB output from another address generator 14 is also supplied to the selector 15. In the selector 15, one of the address information signals ADRA and ADRB is selected by a multiplexer 64, and the selected signal is output as an address information signal ADDR. The signal ADDR is supplied to the image memory 11 via the selector 17. A signal for switching a selection of the multiplexer 64 is supplied by a flip-flop 63.

The flip-flop 63 is an edge trigger type RS flip-flop, and a signal ENa is supplied to an input terminal thereof and a signal ENb is supplied to a reset terminal thereof. The signal ENa is a result of an AND operation on area signals EN1a and EN2b generated in the address generator 13, and the signal ENb is a result of an AND operation on area signals EN1b and EN2b generated in the address generator 13. Accordingly, the signal ENa is at a high level during the scanning operation corresponding to the dimension XSZ in the X direction from the time when the signal ST2 is generated, and the signal ENb is at a high level during the scanning operation corresponding to the dimension YSZ in the Y direction from the time when the signal ST2 is generated. Therefore, the flip-flop 63 is set or reset by a rising edge of the signal ENa or ENb after the signal ST2 is generated.

Figure 7:
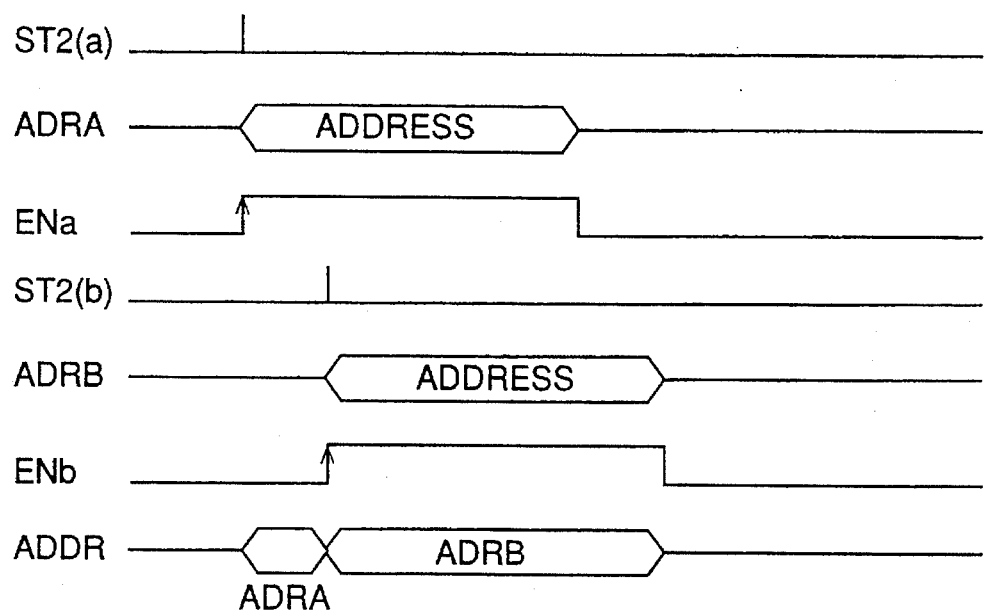
FIG. 7 is a time chart of signals of the selector shown in FIG. 1.

When the signal ST2(a) of the address generator 13 and the signal ST2(b) of the address generator 14 are generated one after another, for example, the signal ADRA and the signal ADRB are selected as the signal ADDR as shown in FIG. 7. Accordingly, the address used for reading out the image data in the image memory 11 is changed in accordance with the generation of the signal ST2.

In the image memory 11, as shown in FIG. 5, an image data is stored, which comprises pixel data corresponding to an image derived from an original image. The image data is, in turn, read out in accordance with the address information signal ADDR, starting from a base point P0 in the scanning direction. The read out data is then supplied to the printer 12 so as to be recorded on a recording sheet as a copy image.

FIG. 8 shows an example of output image obtained by the present embodiment. In this example, The offset values in the address generator 13 are set to XOF(a) and YOF(a), and the offset values in the address generator 14 are set to XOF(b) and YOF(b). Accordingly, the signal ST2(a) of the address generator 13 is generated at the time when the scanning position is at each of points P1a, P2a and P3a, and the signal ST2(b) of the address generator 14 is generated at the time when the scanning position is at each of points P1b, P2b and P3b.

Since it is set that XSZ<XPT and YSZ<YPT, the image element starting from the point P1b is partially superimposed with the image element starting from the point P1a. Similarly, the image element starting from the point P2b is partially superimposed with the image element starting from the point P2a, and the image element starting from the point P3b is partially superimposed with the image element starting from the point P3a. In the superimposed area, an image element recorded later is recorded so that a later image-element covers a prior image-element and the superimposed portion of the prior image-element does not appear.

Figure 9:
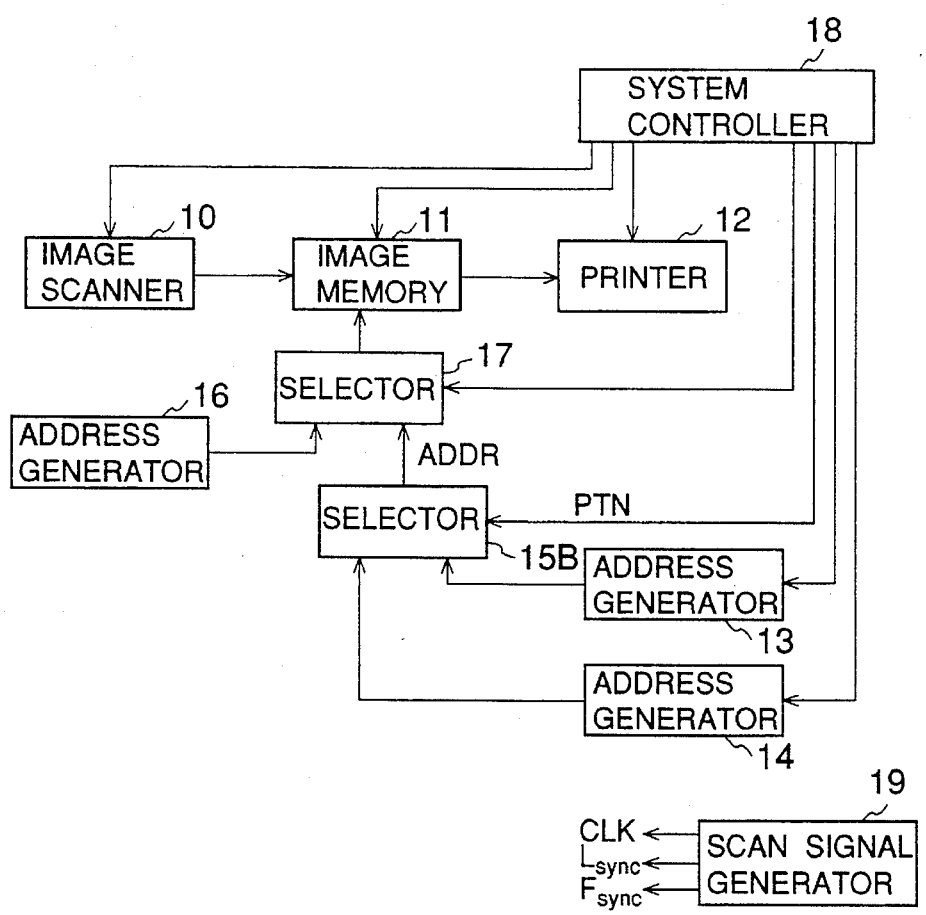
FIG. 9 is a block diagram of a first variation of the embodiment shown in FIG. 1.

FIG. 9 shows a construction of a first variation of the embodiment shown in FIG. 1. In FIG. 9, parts that are the same as parts shown in FIG. 1 are given the same reference numerals, and descriptions thereof will be omitted. In FIG. 9, a selector 15B, which has a construction different from that of the selector 15 of FIG. 1, is supplied with a pattern signal PTN from the system controller 18.

Figure 10:
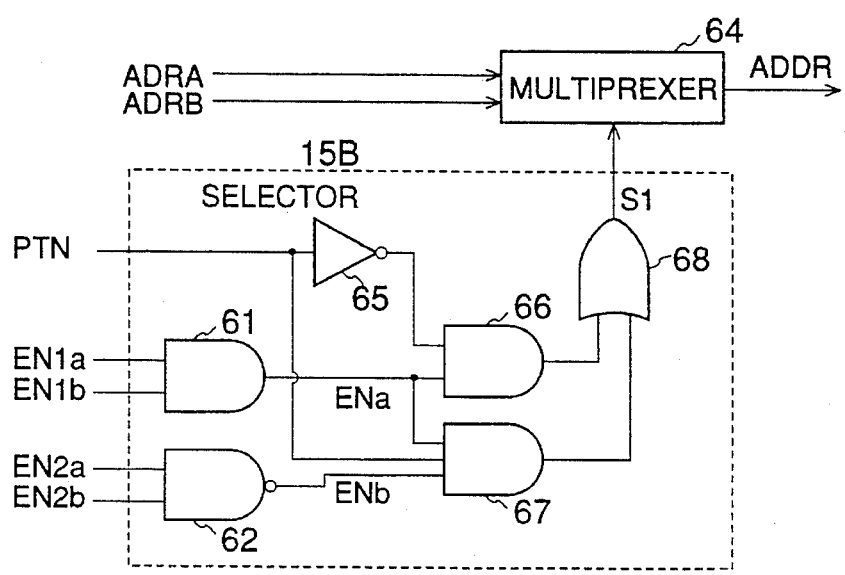
FIG. 10 is a block diagram of a selector shown in FIG. 9.
Figure 11:
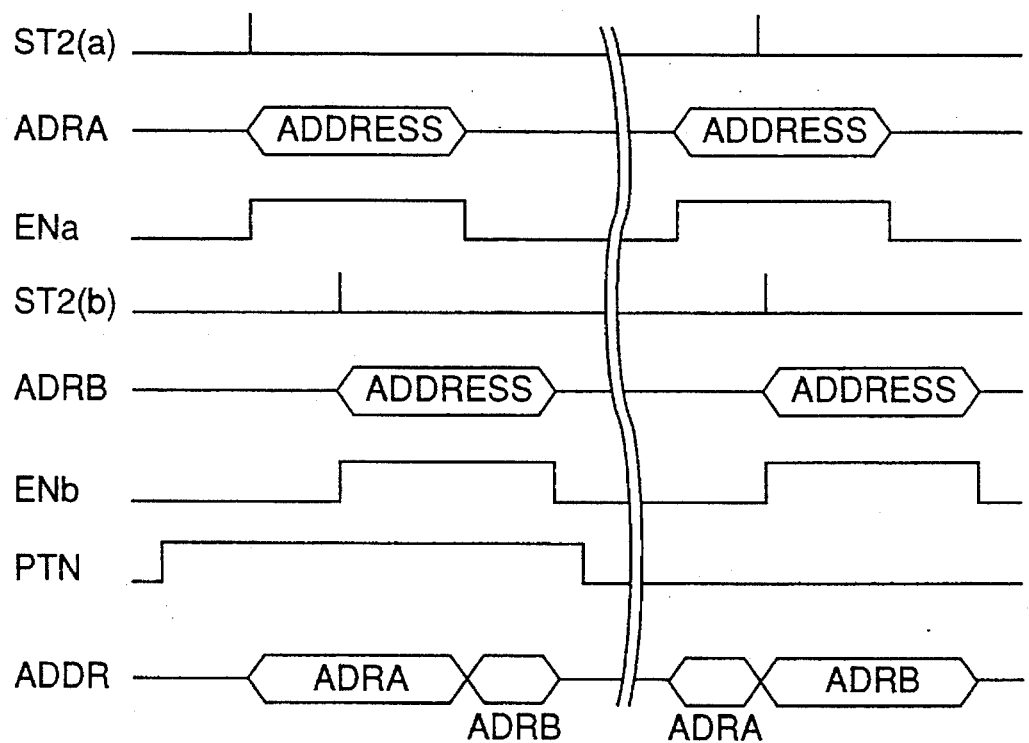
FIG. 11 is a time chart of signals in a circuit shown in FIG. 10.

FIG. 10 shows a construction of the selector 15B, and FIG. 11 shows a timing chart of the circuit shown in FIG. 10. As shown in FIG. 10, the selector 15B comprises AND circuits 61, 62, 66 and 67, a NOT circuit 65, and an OR circuit 68. The pattern signal PTN is supplied to the NOT circuit 65 and the AND circuit 67. The AND circuit 61 is supplied with the signals EN1a and EN1b, and the AND circuit 62 is supplied with the signals EN2a and EN2b. A selection signal S1 is output from the OR circuit 68. The selection signal S1 is supplied to the multiplexer 64 so as to control the selecting operation performed by the multiplexer 64. That is, if the selection signal S1 is at a high level, the multiplexer selects and outputs the signal ADRA. If the selection signal S1 is at a low level, the multiplexer 64 selects and outputs the signal ADRB.

Figure 12:
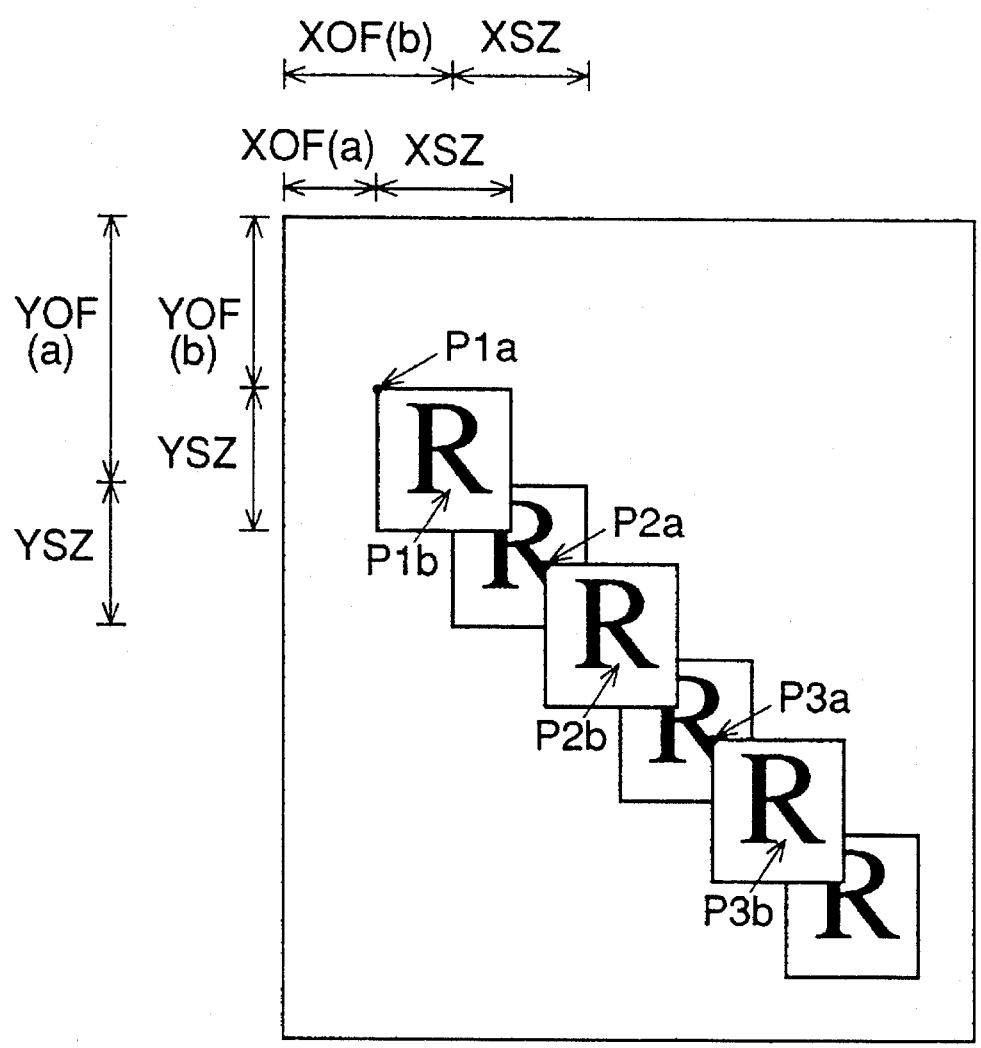
FIG. 12 is a plan view of an output image obtained by the first variation shown in FIG. 9.

In the present variation, the priority of the image element to be recorded is determined by a level (H/L) of the signal PTN. For example, if the signal PTN is at a high level H, since the address information signal ADRA output from the address generator 13 has a higher priority, an output image is formed as shown in FIG. 12. That is, the image elements starting from the points P1a, P2a and P3a are superimposed over the image elements starting from the points P1b, P2b and P3b. The level of the pattern signal PTN is controlled by the system controller 18 in accordance with an input via an operational keyboard.

Figure 13:
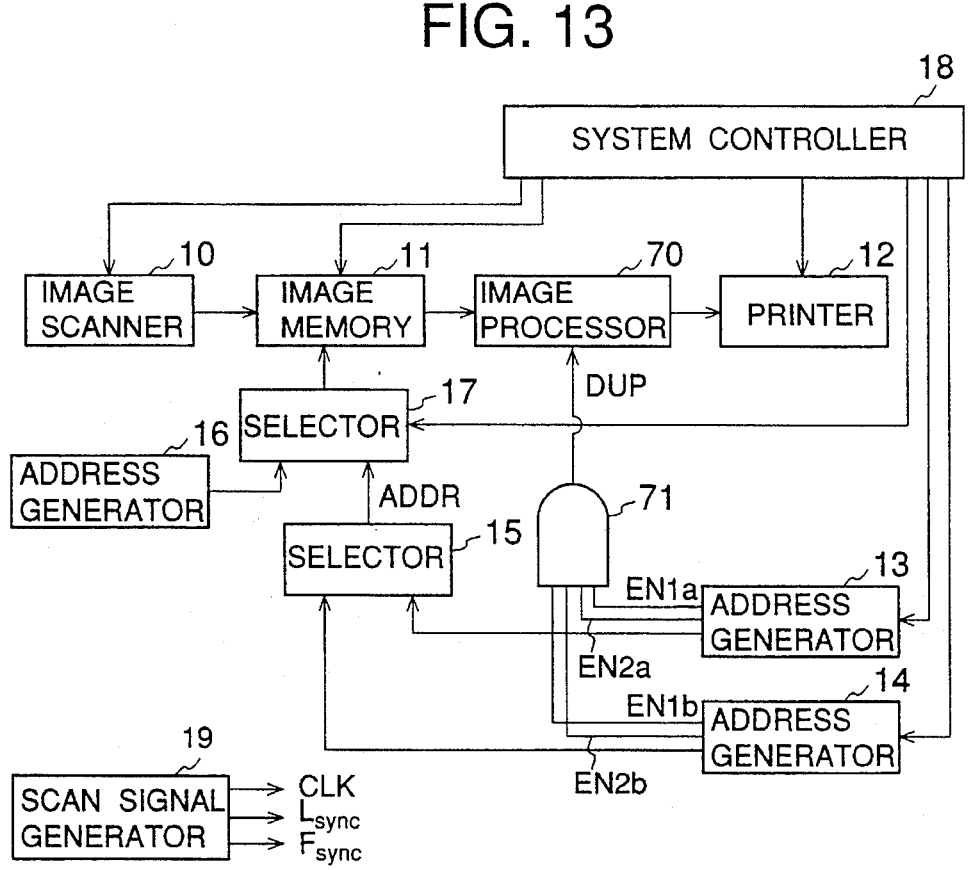
FIG. 13 is a block diagram of a second variation of the embodiment shown in FIG. 1.

FIG. 13 shows a construction of a second variation of the embodiment shown in FIG. 1. In FIG. 13, parts that are the same as parts shown in FIG. 1 are given the same reference numerals, and descriptions thereof will be omitted. As shown in FIG. 13, the second variation is provided with an image processor 70 between the image memory 11 and the printer 12. The image processor 70 is, for example, a processor for shading an image area of which process is performed in general word processors. Application of the shading process, that is, whether or not the shading is applied, is controlled by a level of a control signal DUP supplied by an AND gate 71.

Figure 14:
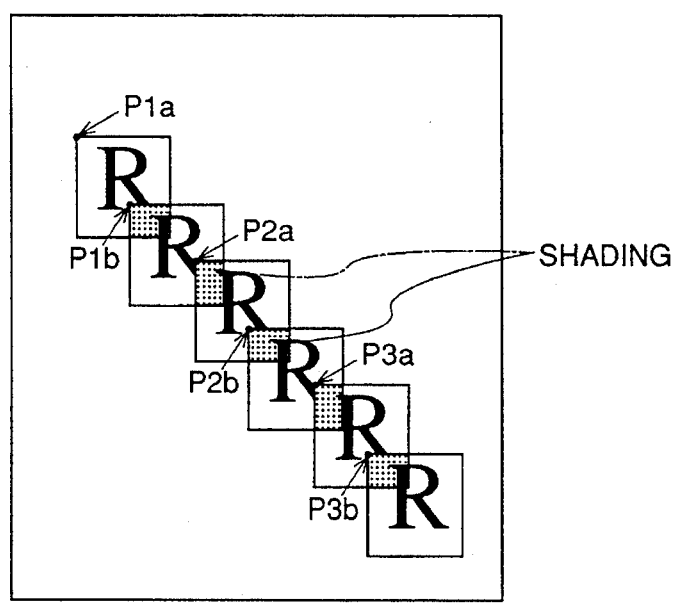
FIG. 14 is a plan view of an output image obtained by the second variation shown in FIG. 13.

The control signal DUP is generated by the AND gate 71 in accordance with the signals EN1a and EN2a supplied by the address generator 13 and the signals EN1b and EN2b supplied by the address generator 14. That is, the level of the control signal becomes the high level when all the signals EN1a, EN2a, EN1b and EN2b are at high level. This condition indicates that the area of the image element assigned to the address generator 13 and that of the address generator 14 are superimposed with each other. When there is no superimposed portion, the control signal DUP becomes the low level and thus the shading process is not applied. An example of the output image in which the shading process is applied to superimposed portions is shown in FIG. 14.

Figure 15:
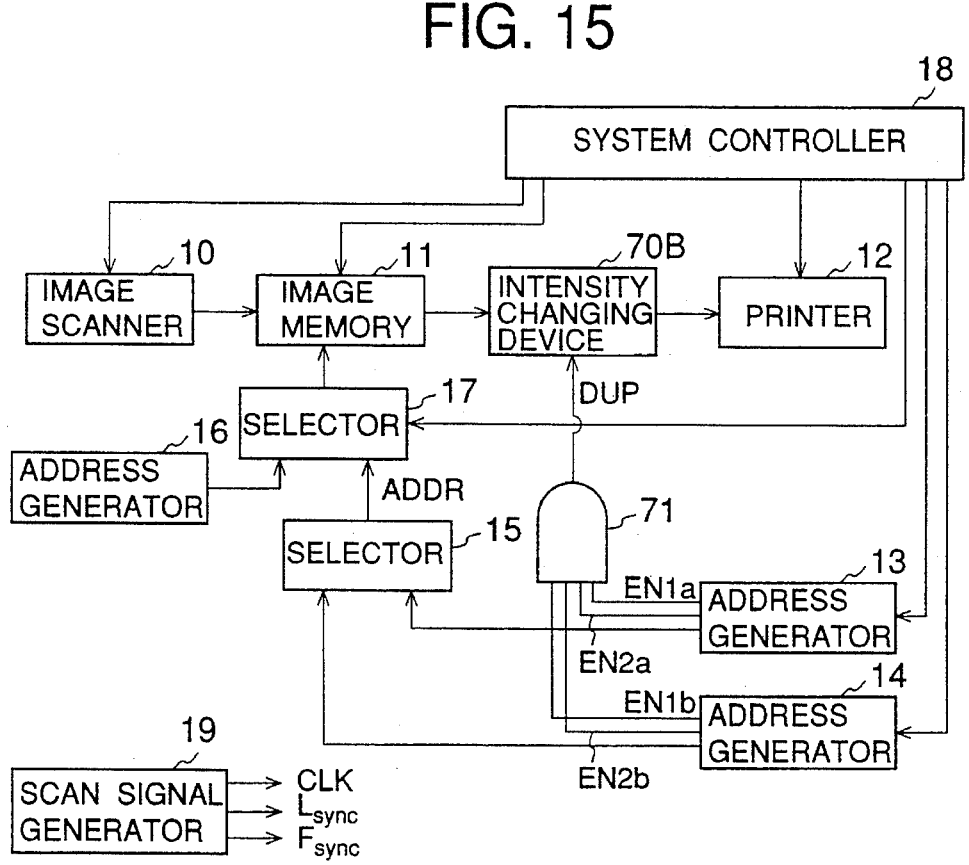
FIG. 15 is a block diagram of a third variation of the embodiment shown in FIG. 1.
Figure 16:
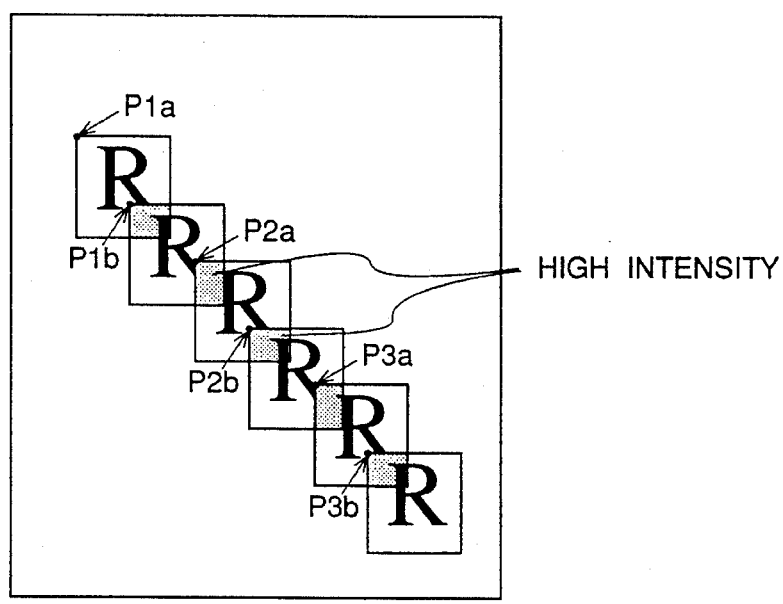
FIG. 16 is a plan view of an output image obtained by the third variation shown in FIG. 15.

FIG. 15 shows a construction of a third variation of the embodiment shown in FIG. 1. In FIG. 15, parts that are the same as parts shown in FIG. 13 are given the same reference numerals, and descriptions thereof will be omitted. As shown in FIG. 15, the third variation is provided with an intensity changing device 70B between the image memory 11 and the printer 12. The intensity changing device 70B is a processor for changing an intensity of image area in accordance with the control signal DUP. Similar to the second variation, application of an intensity changing process, that is, whether or not the intensity changing is applied, is controlled by a level of a control signal DUP supplied by the AND gate 71. The intensity of area corresponding to the superimposed portions is changed with respect to a portion other than superimposed portion, by the intensity changing process, for example. An example of the output image is shown in FIG. 16, in which output image the intensity changing process is applied to superimposed portions so that the superimposed portions becomes darker than other portion.

Figure 17:
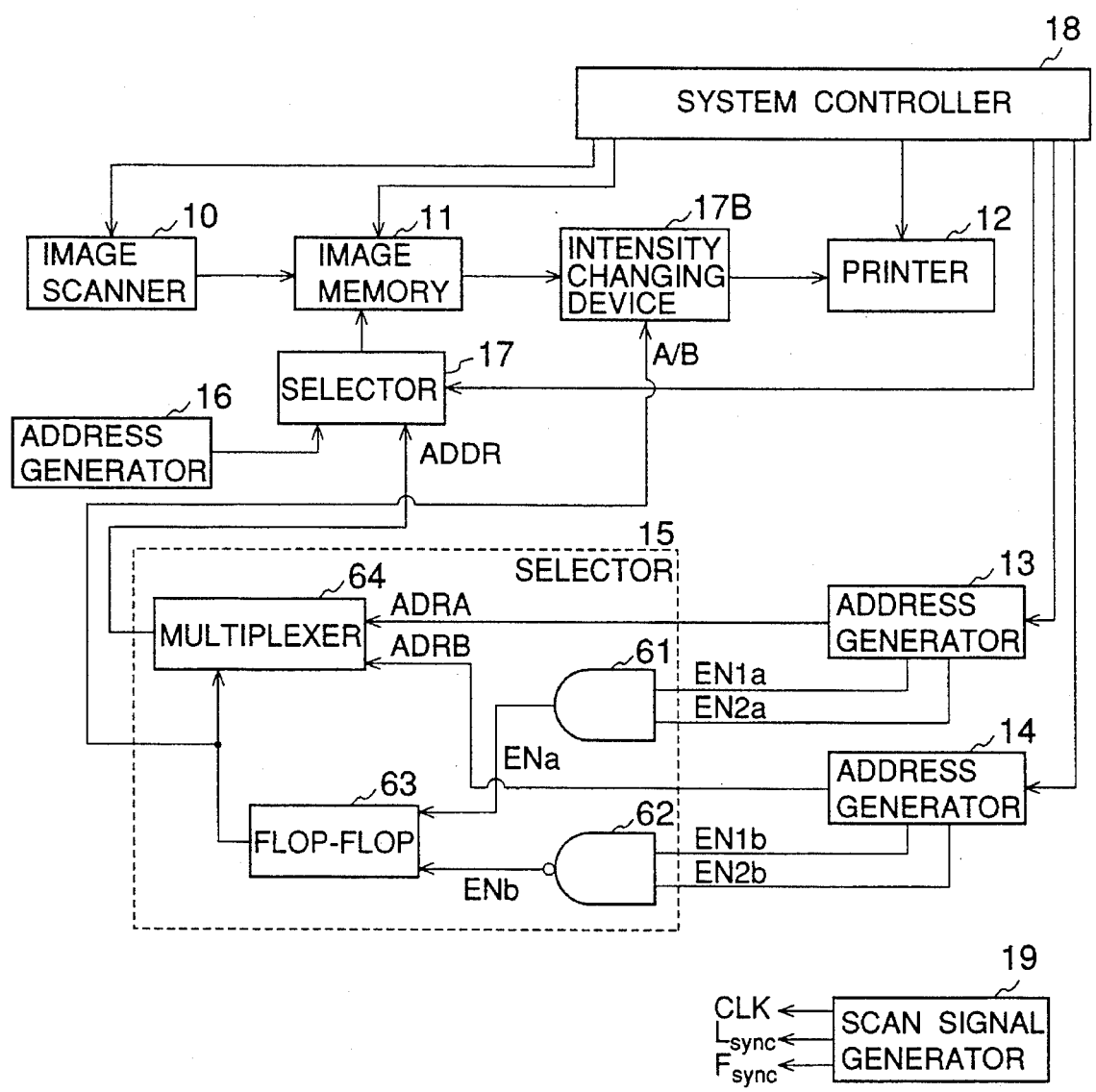
FIG. 17 is a block diagram of a fourth variation of the embodiment shown in FIG. 1.
Figure 18:
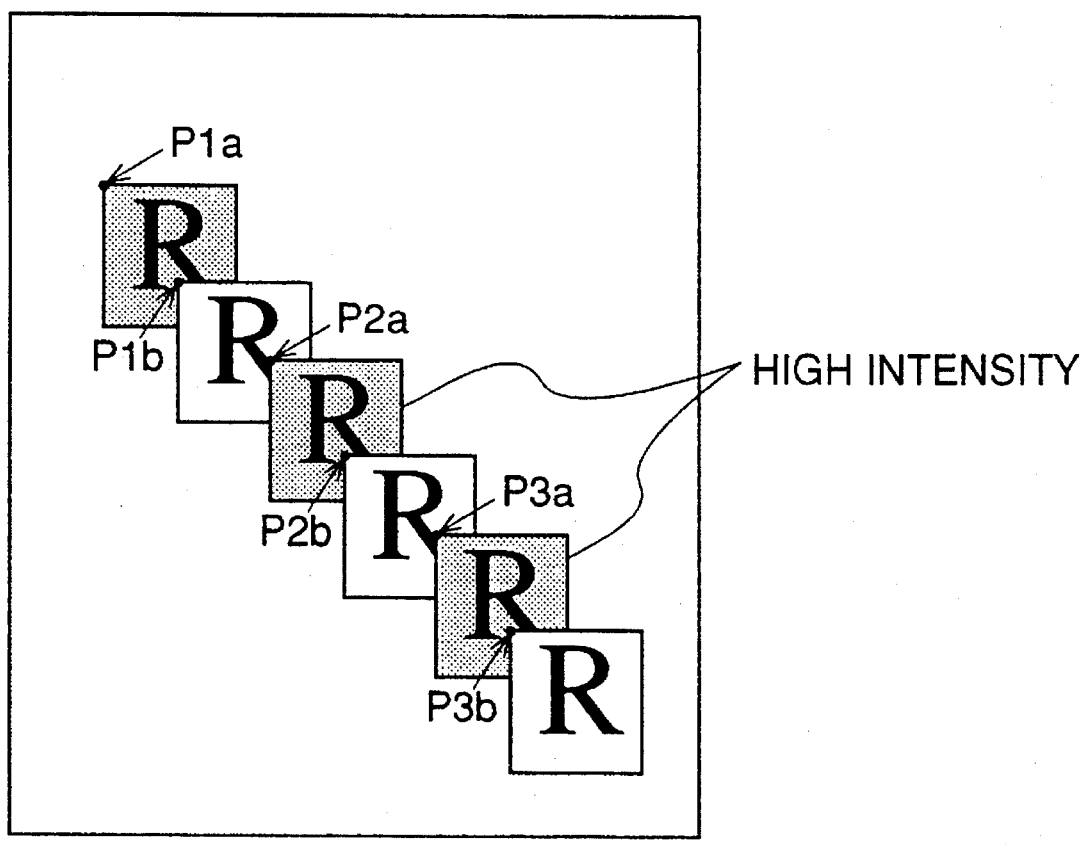
FIG. 18 is a plan view of an output image obtained by the fourth variation shown in FIG. 17.

FIG. 17 shows a construction of a fourth variation of the embodiment shown in FIG. 1. In FIG. 17, parts that are the same as parts shown in FIG. 15 are given the same reference numerals, and descriptions thereof will be omitted. As shown in FIG. 17, the fourth variation is provided, similarly to the third variation, with an intensity changing device 70B between the image memory 11 and the printer 12. A control signal A/B generated in the selector 15 is supplied to the intensity changing device 70B. The control signal A/B indicates which of the two signals ADRA and ADRB the multiplexer 64 selects. That is, the fourth variation controls changing of the recording intensity of the image element by means of the intensity changing device 70B so that the intensity of the image element assigned by the address generator varies from the intensity of the image element assigned by the address generator 14. An example of the output image is shown in FIG. 18, in which output image the intensity changing process is applied so that the image elements starting from the points P1a, P2a and P3a are recorded with intensity higher than that of the image elements starting from the points P1b, P2b and P3b.

Figure 19:
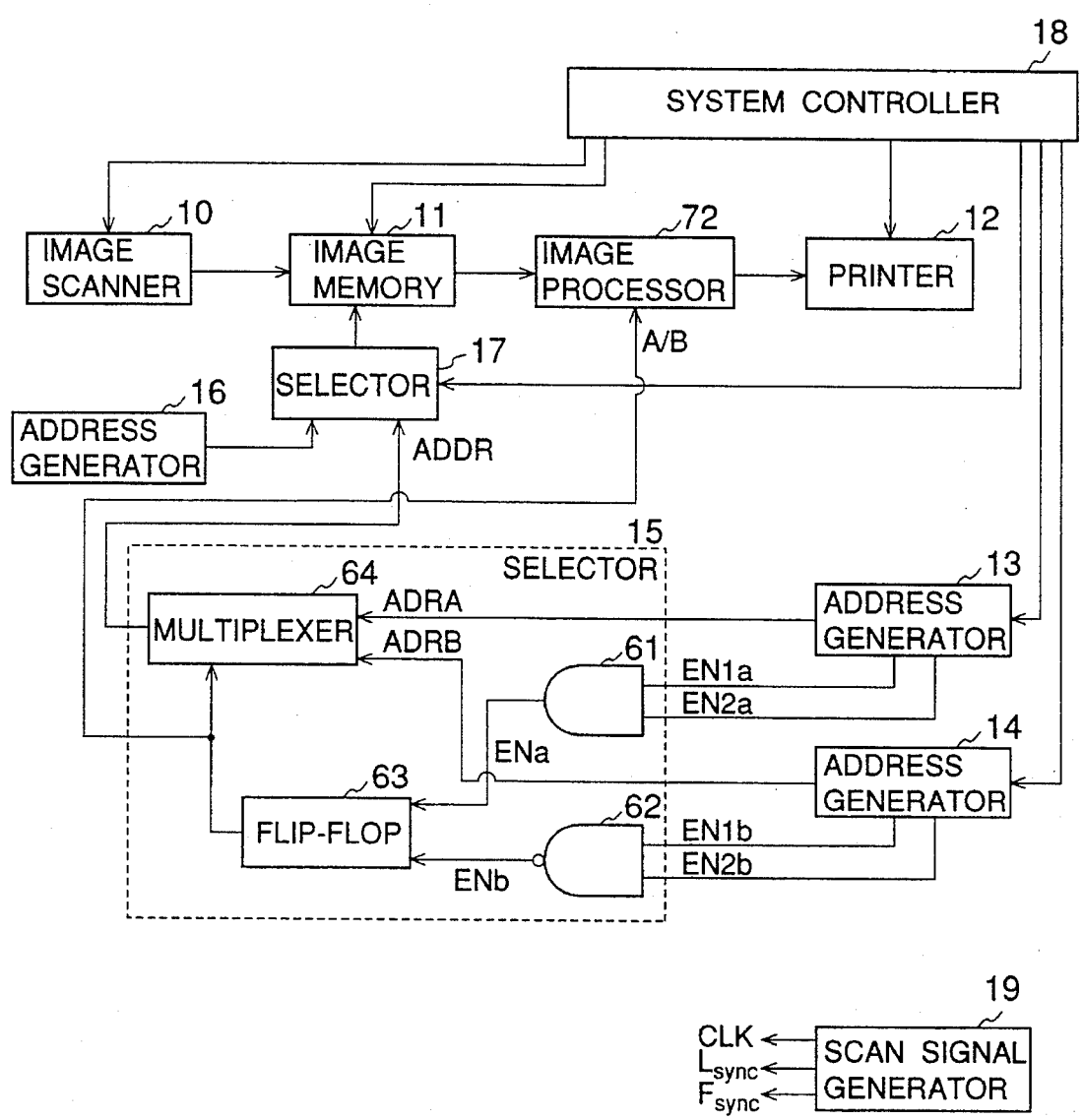
FIG. 19 is a block diagram of a fifth variation of the embodiment shown in FIG. 1.
Figure 20:
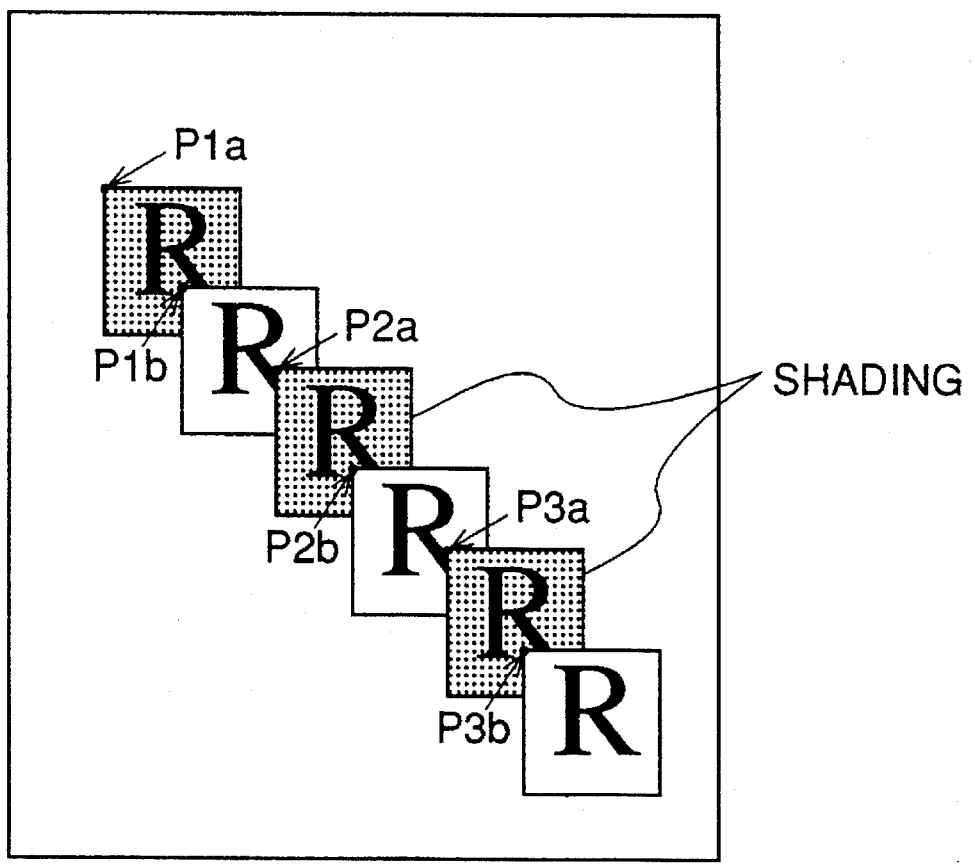
FIG. 20 is a plan view of an output image obtained by the fifth variation shown in FIG. 19.

FIG. 19 shows a construction of a fifth variation of the embodiment shown in FIG. 1. In FIG. 19, parts that are the same as parts shown in FIG. 17 are given the same reference numerals, and descriptions thereof will be omitted. As shown in FIG. 19, the fifth variation is provided, similarly to the fourth variation, with an image processor 72 between the image memory 11 and the printer 12. A control signal A/B generated in the selector 15 is supplied to the image processor 72 similarly to the image processor 70 of FIG. 13. The control signal A/B indicates which of the two signals ADRA and ADRB the multiplexer 64 selects. That is, the fourth variation controls changing of recording intensity of the image element by means of the image processor 72 so that the shading process is applied to either one of the image element assigned by the address generator and the image element assigned by the address generator 14. An example of the output image is shown in FIG. 20, in which output image the shading process is applied so that the image elements starting from the points P1a, P2a and P3a are shaded.

It should be noted that although, in the above-mentioned embodiment and variations, the image data corresponding to the image element is stored in the image memory 11, an image data supplied by a computer or pattern information data corresponding to a character code may be stored in the image memory 11. Means for storing data such as a ROM or a CD-ROM may be used instead of the image memory 11. Additionally, an outputting means is not limited to a printer, a CRT display or a magnetic recording medium may be used instead of the printer.

Although, in the above-mentioned embodiment, the output image has image elements arranged in a diagonal direction, the image elements can be arranged in a longitudinal direction or a transverse direction. For example, by replacing the adder 22 of FIG. 2 with a subtracter, the direction of the arrangement is changed to an opposite direction.

The address generators 13, 14 are not limited, in number, to two. Further, the priority order of the signals to be selected by the selector can be changed so that a prior image element has a higher priority, or the priority order may be determined by using a counter.

Additionally, the image processor is described as performing a shading process, but other image processes can be used, and a plurality of image processor may be provided in order to apply a different image process by switching the active image process in accordance with the control signal.

Further, the present invention is not limited to binary images, and can be used with multicolor images. For example, when a three-color image is used, memories should be provided for each color, respectively, and the same address information should be supplied to each of the memories.

The present invention is not limited to the specifically disclosed embodiments, and variations and modifications may be made without departing from the scope of the present invention.

What is claimed is:

1. An image data processing unit which can output image data to an image forming apparatus so that a plurality of identical images are formed in a single output image area, the image data-processing unit comprising:

memory means for storing image data corresponding to said identical images, said image data being supplied by an external source;

reading signal generating means for generating a plurality of reading signals used for reading out said image data in said memory means, each of said reading signals providing information for an area in said single output image in which area one of said identical images is to be formed;

selecting means for selecting one of said reading signals supplied by said reading signal generating means, the selection being performed when said areas, in each of which one of said identical images are to be formed, are at least partially superimposed on each other; wherein said memory means outputs image data stored therein in accordance with said selected reading signal supplied by said selecting means;

detecting means for detecting a superimposed portion of said identical images; and image data processing means for processing the image data output from said memory means so that a portion of image data corresponding to said superimposed portions of said identical images is processed so that said superimposed portions are distinguishable from non-superimposed portions of said identical images by a predetermined technique applied to said superimposed portions but not to said non-superimposed portions.

2. The image data processing unit as claimed in claim 1, wherein said image data processing means is defined as a means for applying a process to image data so that an image formed by the processed image data is shaded.

3. The image data processing unit as claimed in claim 1, wherein said image data processing means is defined as a means for applying a process to image data so that an intensity of an image formed by the processed image data is changed.

4. The image data processing unit as claimed in claim 3, wherein the intensity of an image formed by the processed image data is increased.

5. An image data processing unit which can output image data to an image forming apparatus so that a plurality of identical images are formed in a single output image area, the image data processing unit comprising:

memory means for storing image data corresponding to said identical images, said image data being supplied by an external source;

reading signal generating means for generating a plurality of reading signals used for reading out said image data in said memory means, each of said reading signals providing information for an area in said single output image in which area one of said identical images is to be formed;

selecting means for selecting one of said reading signals supplied by said reading signal generating means, the selection being performed when said areas, in each of which one of said identical images are to be formed, are at least partially superimposed on each other; wherein said memory means outputs image data stored therein in accordance with said selected reading signal supplied by said selecting means; and image data processing means for processing the image data output from said memory means by distinguishing every other identical image by a predetermined technique.

6. The image data processing unit as claimed in claim 5, wherein said image data processing means is defined as a means for applying a process to image data so that an image formed by the processed image data is shaded.

7. The image data processing unit as claimed in claim 5, wherein said image data processing means is defined as a means for applying a process to image data so that an intensity of an image formed by the processed image data is changed.

8. The image data processing unit as claimed in claim 7, wherein the intensity of an image formed by the processed image data is increased.

9. An image data processing unit which can output image data to an image forming apparatus so that a plurality of images are superimposed in a single output image forming area, the image data processing unit comprising:

at least one memory means for storing image data corresponding to said plurality of images;

reading signal generating means for generating a plurality of reading signals used for reading out said image data from said at least one memory means in such a manner that said plurality of images are at least partially superimposed on each other in said single output image forming area, said plurality of images thus having superimposed portions and a non-superimposed portions; and image data processing means for applying a predetermined image processing technique to either the image data read out from said memory means which corresponds to the superimposed portions of the plurality of images or the image data read out from said memory means which corresponds to one of the non-superimposed portions of the plurality of images and for producing processed image data which is visually distinguishable from non-processed image data when formed in said single output image forming area; and image data outputting means for outputting said processed image data to said image forming apparatus so that said plurality of images are superimposed when formed in said single output image forming area and said superimposed portions are visually distinguishable from the non-superimposed portions.

10. The image data processing unit as claimed in claim 9, wherein said predetermined image processing technique comprises a shading technique.

11. The image data processing unit as claimed in claim 9, wherein said predetermined image processing technique comprises an intensification technique.

12. The image data processing unit as claimed in claim 9, wherein said predetermined image processing technique is applied to the image data read out from said memory means which corresponds to the non-superimposed portions of one of the plurality of images.

13. The image data processing unit as claimed in claim 12, wherein said predetermined image processing technique comprises a shading technique.

14. The image data processing unit as claimed in claim 12, wherein said predetermined image processing technique comprises an intensification technique.

* * * * *